(12) United States Patent
Fuechtner

(10) Patent No.: US 8,480,523 B2
(45) Date of Patent: Jul. 9, 2013

(54) HYBRID DRIVE TRAIN

(75) Inventor: Martin Fuechtner, Stuttgart (DE)

(73) Assignee: Dr. Ing. H.C.F. Porsche Aktiengesellschaft (DE)

( * ) Notice: Subject to any disclaimer, the term of this patent is extended or adjusted under 35 U.S.C. 154(b) by 168 days.

(21) Appl. No.: 13/010,056

(22) Filed: Jan. 20, 2011

(65) Prior Publication Data

US 2011/0183802 A1 Jul. 28, 2011

(30) Foreign Application Priority Data

Jan. 28, 2010 (DE) .......................... 10 2010 006 043

(51) Int. Cl.
*F16H 3/72* (2006.01)

(52) U.S. Cl.
USPC ............................................................ 475/5

(58) Field of Classification Search
USPC ............................................................ 475/5
See application file for complete search history.

(56) References Cited

U.S. PATENT DOCUMENTS

| | | | |
|---|---|---|---|
| 6,502,652 B2 | 1/2003 | Rogg | |
| 6,634,247 B2 | 10/2003 | Pels et al. | |
| 6,719,655 B2 | 4/2004 | Kramer | |
| 7,086,977 B2 * | 8/2006 | Supina et al. | 475/5 |
| 7,175,555 B2 * | 2/2007 | Kozarekar et al. | 475/5 |
| 7,410,436 B2 | 8/2008 | Van Druten et al. | |
| 7,473,200 B2 | 1/2009 | Raghavan et al. | |
| 7,690,459 B2 * | 4/2010 | Schondorf et al. | 180/65.6 |
| 8,235,853 B2 * | 8/2012 | Lutoslawski | 475/5 |
| 8,267,825 B2 * | 9/2012 | Kakinuma et al. | 475/152 |
| 2003/0045389 A1 | 3/2003 | Kima | |
| 2007/0074595 A1 | 4/2007 | Sakamoto et al. | |
| 2008/0314661 A1 | 12/2008 | Soliman et al. | |
| 2008/0318728 A1 | 12/2008 | Soliman et al. | |
| 2010/0107921 A1 | 5/2010 | Kakinuma et al. | |
| 2010/0216584 A1 | 8/2010 | Lutoslawski | |

FOREIGN PATENT DOCUMENTS

| | | |
|---|---|---|
| DE | 10 2006 036 758 | 2/2008 |
| DE | 10 2007 051 991 | 5/2009 |
| EP | 2 088 046 | 8/2008 |
| EP | 2 088 045 | 8/2009 |
| JP | 2004074990 | 3/2004 |
| JP | 2005155891 | 6/2005 |
| JP | 2005351381 | 12/2005 |
| JP | 2006105252 | 4/2006 |
| JP | 2008037304 | 2/2008 |
| JP | 2008174118 | 7/2008 |
| JP | 2009511328 | 3/2009 |
| JP | 2009166567 | 7/2009 |

\* cited by examiner

*Primary Examiner* — Dirk Wright
(74) *Attorney, Agent, or Firm* — Gerald E. Hespos; Michael J. Porco; Matthew T. Hespos

(57) ABSTRACT

A hybrid drive train has an internal combustion engine (2), an electric machine (30), a clutch device (10) and a variable speed transmission (5) via which a transmission input shaft (13) can be coupled to an output shaft (6), and having a planetary gear mechanism (33). To improve the properties of a hybrid vehicle having the hybrid drive train with respect to energy consumption and/or a sporty driving style, the electric machine (30) is coupled to the transmission input shaft (13) and the output shaft (6) via the planetary gear mechanism (33).

6 Claims, 2 Drawing Sheets

HYBRID DRIVE TRAIN

CROSS-REFERENCE TO RELATED APPLICATION

This application claims priority under 35 USC 119 to German Patent Application No. 10 2010 006 043.7, filed on Jan. 28, 2010, the entire disclosure of which is incorporated herein by reference.

BACKGROUND OF THE INVENTION

1. Field of the Invention

The invention relates to a hybrid drive train having an internal combustion engine, an electric machine, a clutch device and a variable speed transmission via which a transmission input shaft can be coupled to an output shaft, and having a planetary gear mechanism.

2. Description of the Related Art

U.S. Pat. No. 6,719,655 B2 discloses an electrodynamic drive system having a drive machine, a manual transmission and a planetary gear mechanism. The drive system has a first element connected to the manual transmission, a second element connected to the drive machine and a third element connected to at least one electric machine. The clutch has first and second shifted positions. A rotationally fixed connection is present between the planetary carrier and the sun gear in the first shifted position for bypassing the planetary gear mechanism. The connection between the planetary carrier and the sun gear is disconnected in the second shifted position. Further drive trains are disclosed, for example, in documents U.S. Pat. No. 7,410,436 B2, U.S. Pat. No. 6,634,247 B2, US 2008/0318728 A1, US 2008/0314661 A1, EP 2 088 045 A1, EP 2 088 046 A1, DE 10 2006 036 758 A1 and DE 10 2007 051 991 A1.

The object of the invention is to improve the properties of a hybrid vehicle having a hybrid drive train, in particular with respect to energy consumption and/or a sporty driving style.

SUMMARY OF THE INVENTION

The invention relates to a hybrid drive train having an internal combustion engine, an electric machine, a clutch device and a variable speed transmission, by means of which a transmission input shaft can be coupled to an output shaft, and having a planetary gear mechanism. The electric machine is coupled to the transmission input shaft and the output shaft via the planetary gear mechanism. As a result, a variable rotation speed ratio between the internal combustion engine, the electric machine and the output shaft can be implemented in a simple way. Furthermore, cold starting of the internal combustion engine is made possible in a simple way using the electric machine. The clutch device is closed to start the internal combustion engine on the basis of electric travel. The electric machine preferably is coupled permanently to the transmission input shaft via the planetary gear mechanism.

A planetary gear carrier of the planetary gear mechanism preferably is connected to an output shaft of the electric machine and is fixed thereto in terms of rotation. Plural planetary gears preferably are rotatably mounted on the planetary gear carrier. The planetary gears preferably are engaged with a sun gear and a ring gear.

The planetary gear carrier of the planetary gear mechanism preferably is coupled to the output shaft. The coupling preferably is carried out by at least one gear wheel. The gear wheel is connected to the output shaft and fixed thereto in terms of rotation and engages a toothing arrangement on the planetary gear carrier.

A sun gear of the planetary gear mechanism preferably is coupled to the transmission input shaft of the variable speed transmission. The coupling is carried out, for example, by two gear wheels. One of the gear wheels is connected to the sun gear of the planetary gear mechanism and is fixed thereto in terms of rotation, and meshes with a further gear wheel that is connected to the transmission input shaft so as to be fixed thereto in terms of rotation.

The planetary gear carrier of the planetary gear mechanism preferably is coupled to a layshaft of the variable speed transmission. The planetary gear carrier is coupled via the layshaft to the transmission input shaft using, for example, gear wheels.

A sun gear of the planetary gear mechanism preferably is coupled to the output shaft. The coupling to the output shaft is carried out, for example, by gear wheels. One of the gear wheels is connected to the sun gear of the planetary gear mechanism so as to be fixed thereto in terms of rotation, and is engages a further gear wheel that is connected to the output shaft so as to be fixed thereto in terms of rotation.

A clutch preferably is arranged between the sun gear of the planetary gear mechanism and the output shaft. The rotationally fixed connection between the sun gear of the planetary gear mechanism and the output shaft can be established or disconnected as a function of requirements by means of the clutch.

A further electric machine may be coupled to the output shaft. The further electric machine preferably is coupled to the output shaft via the sun gear of the planetary gear mechanism with an intermediate connection of the clutch. The further electric machine and the clutch easily permit a running start with the further electric machine.

The clutch device preferably is a double clutch, and the variable speed transmission is a double clutch transmission.

A layshaft of the variable speed transmission may be coupled to the output shaft, for example via gear wheels.

Further advantages, features and details of the invention emerge from the following description in which two exemplary embodiments are described in detail with reference to the drawings.

DETAILED DESCRIPTION OF THE PREFERRED EMBODIMENTS

Figure 1:
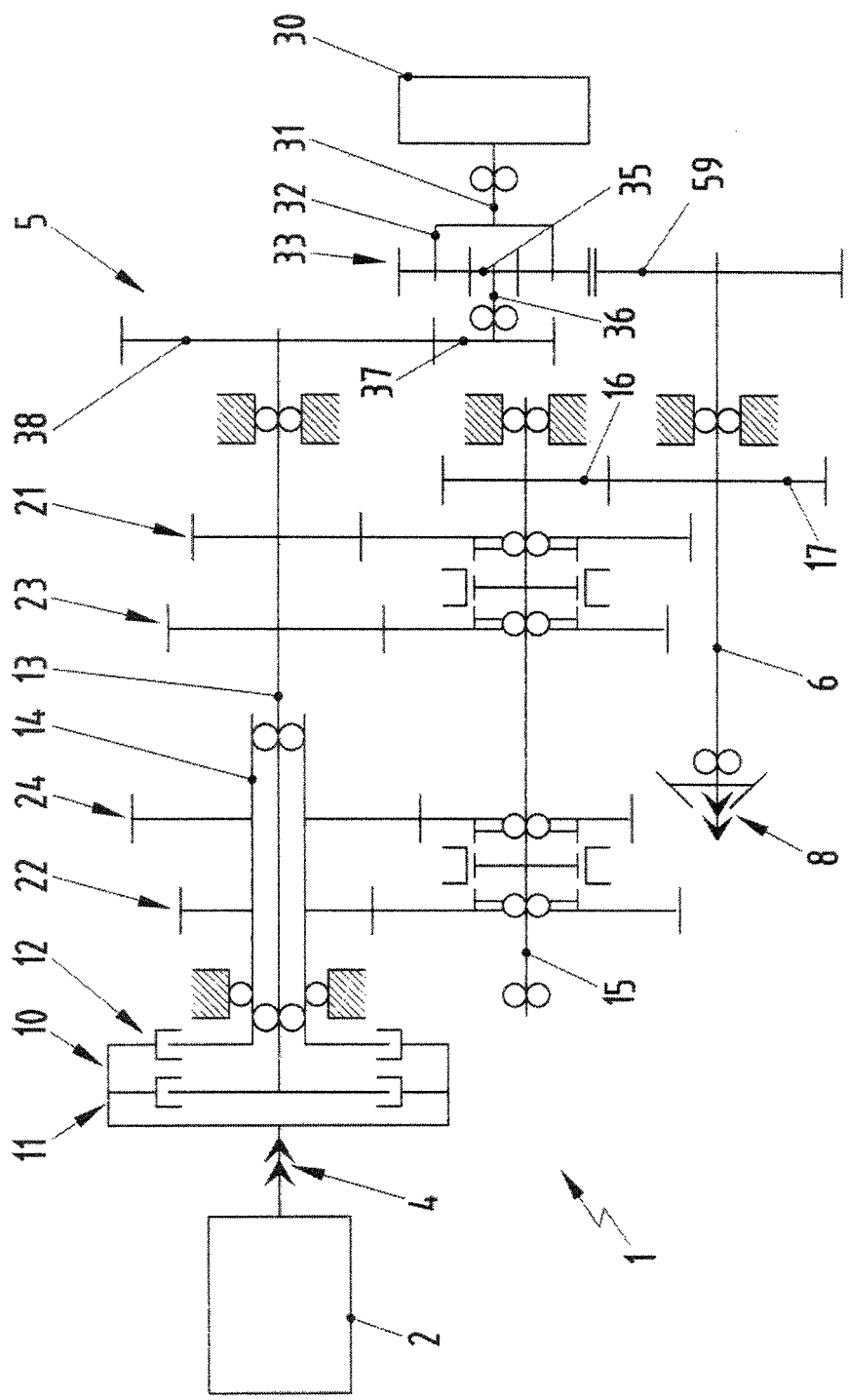
FIG. 1 is a schematic illustration of a hybrid drive train according to a first embodiment with an electric machine.
Figure 2:
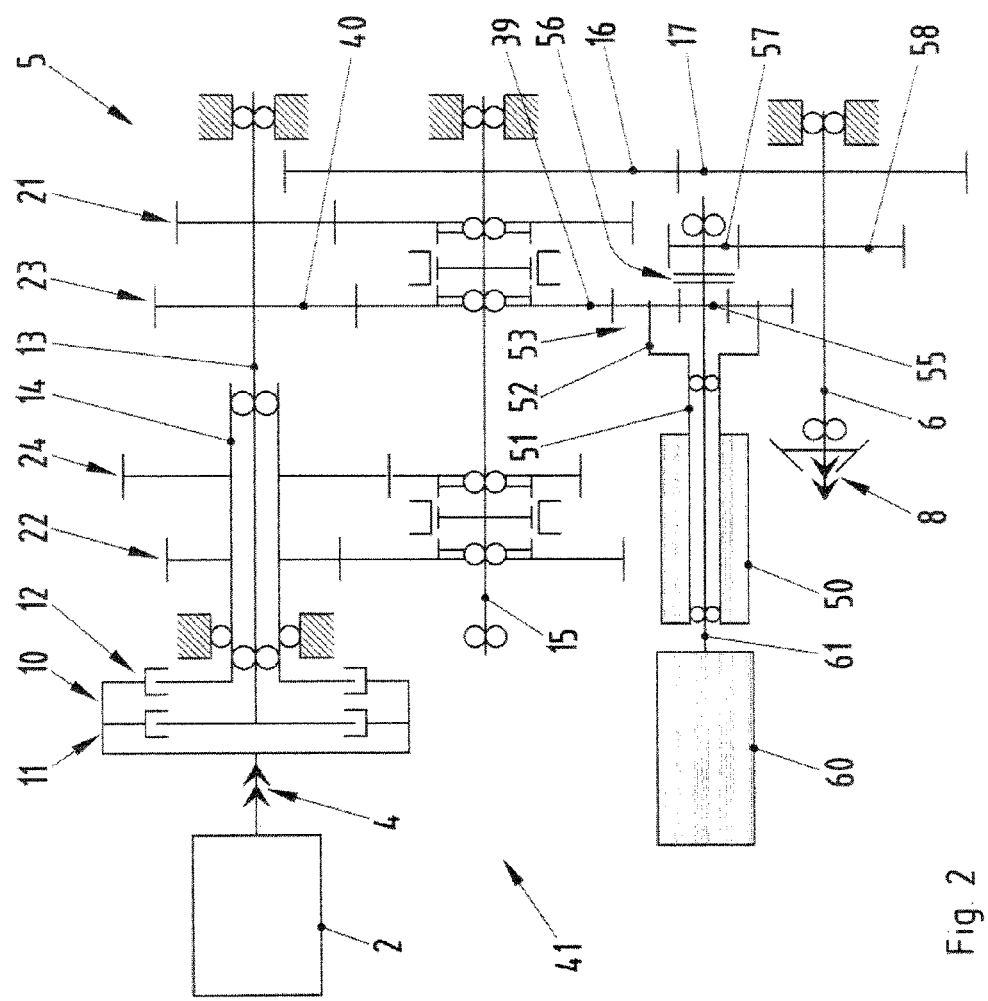
FIG. 2 is a schematic illustration similar to FIG. 1, but with a further electric machine.

FIGS. 1 and 2 each illustrate hybrid drive trains 1; 41 having an internal combustion engine 2 according to two different exemplary embodiments. The same reference symbols are used to denote identical or similar parts. In the text that follows, the common features in the two hybrid drive trains 1; 41 are explained initially. Then the differences between the two embodiments are described in detail.

The internal combustion engine 2 outputs a symbolically indicated drive torque 4 that is converted in a transmission 5 and transmitted to drive wheels of a motor vehicle via an output shaft 6, as is indicated symbolically by reference numeral 8. The transmission 5 is embodied as a variable speed transmission, in particular a double clutch transmission.

The internal combustion engine 2 can be connected via the second clutch 12 to a second transmission input shaft 14 so as to be fixed thereto in terms of rotation. The transmission shaft 14 is embodied as a hollow shaft. The transmission 5 also comprises a layshaft 15 that is coupled to the output shaft 6 via coupling gear wheels 16, 17.

A clutch device 10 is connected between the internal combustion engine 2 and the transmission 5. The clutch device 10 is embodied as a double clutch for the first clutch 11 and a second clutch 12. The internal combustion engine 2 can be connected via the first clutch 11 to a first transmission input shaft 13 of the transmission 5 so as to be fixed thereto in terms of rotation.

Four different gear speeds of the variable speed transmission 5 can be formed using gear wheel pairs 21, 22, 23, 24 to permit different transmission ratios between the internal combustion engine 2 and the output shaft 6. The first transmission input shaft 13 can be coupled to the layshaft 15 via the two gear wheel pairs 21 and 23. The second transmission input shaft 14 can be coupled to the layshaft 15 via the two gear wheel pairs 22 and 24.

The hybrid drive train 1 of FIG. 1 also comprises an electric machine 30 with a drive shaft 31. The drive shaft 31 of the electric machine 30 is connected to a planetary gear carrier 32 of a planetary gear mechanism 33 so as to be fixed thereto in terms of rotation. Planetary gears are mounted rotatably on the planetary gear carrier 32 and engage both a ring gear (not illustrated) and a sun gear 35. The sun gear 35 is connected permanently via a connecting shaft 36 to a gear wheel 37 so as to be fixed thereto in terms of rotation. The gear wheel 37 meshes with a further gear wheel 38 that is connected to the first transmission input shaft 13 so as to be fixed thereto in terms of rotation. The planetary gear carrier 32 is coupled permanently to the output shaft 6 via a gear wheel 59.

In the hybrid drive train 1 of FIG. 1, the electric machine 30 functionally is connected permanently to the first transmission input shaft 13 and the output shaft 6 via the planetary gear mechanism 33 to permit cold starting of the internal combustion engine 2 in a simple way.

Furthermore, the formation of a variable rotational speed ratio between the internal combustion engine 2, the electric machine 30 and the output shaft 6 is made possible in a simple way.

The hybrid drive train 41 illustrated in FIG. 2 comprises an electric machine 50, from which a hollow drive shaft 51 extends. The drive shaft 51 of the electric machine 50 is connected to a planetary gear carrier 52 of a planetary gear mechanism 53 so as to be fixed thereto in terms of rotation. Planetary gears are mounted rotatably on the planetary gear carrier 52 and engage a ring gear (not illustrated) and a sun gear 55. The sun gear 55 can be coupled to the output shaft 6 via two gear wheels 57, 58 and using a clutch 56. The planetary gear carrier 52 is coupled permanently to the first transmission input shaft 19 via gear wheels 39, 30, which constitute the gear pair 23.

The hybrid drive train 41 comprises a further electric machine 60, from which a drive shaft 61 protrudes. The drive shaft 61 extends through the hollow drive shaft 51 of the electric machine 50 and to which the sun gear 55 of the planetary gear mechanism 53 is attached so as to be fixed thereto in terms of rotation. The drive shaft 61 of the further electric machine 60 can be coupled to the output shaft 6 via the clutch 56 and the two gear wheels 57, 58.

The further electric machine 60 can be used to drive the drive wheels of the motor vehicle when the clutch 56 is closed via the gear wheels 57 and 58 to enable a running start, that is to say revving up of the internal combustion engine 2 before the clutch 56 is closed. Alternatively or additionally, a further electric machine (not illustrated) can be provided and can be coupled functionally to the internal combustion engine 2 to start it.

What is claimed is:

1. A hybrid drive train comprising:
   an internal combustion engine,
   a clutch device coupled to the internal combustion engine,
   a variable speed transmission with a transmission input shaft connected to the internal combustion engine via the clutch device,
   an output shaft that can be coupled to the transmission input shaft, and
   an electric machine having a drive shaft,
   a planetary gear mechanism having a planetary gear carrier and a sun gear, the planetary gear carrier being connected directly to the drive shaft of the electric machine so as to be fixed thereto in terms of rotation and being connectable to the output shaft, and the sun gear of the planetary gear mechanism being coupled permanently to the transmission input shaft.

2. The hybrid drive train of claim 1, wherein the clutch device is a double clutch, and the variable speed transmission is a double clutch transmission.

3. A hybrid drive train, comprising:
   an internal combustion engine,
   a clutch device coupled to the internal combustion engine,
   a variable speed transmission with a transmission input shaft connected to the internal combustion engine via the clutch device,
   an output shaft that can be coupled to the transmission input shaft, and
   an electric machine having a drive shaft,
   a planetary gear mechanism having a planetary gear carrier and a sun gear, the planetary gear carrier of the planetary gear mechanism being coupled to a layshaft of the variable speed transmission and the sun gear being coupled to the output shaft.

4. The hybrid drive train of claim 3, further comprising a clutch arranged between the sun gear of the planetary gear mechanism and the output shaft.

5. The hybrid drive train of claim 3, wherein a further electric machine is coupled to the output shaft.

6. The hybrid drive train of claim 3, wherein a further electric machine is coupled to the internal combustion engine.

* * * * *